United States Patent [19]

Elkins

[11] 4,441,793
[45] Apr. 10, 1984

[54] MICROSCOPIC EVALUATION SLIDE

[76] Inventor: Carlos D. Elkins, 1414 S. Fairplain Ave., Whittier, Calif. 90601

[21] Appl. No.: 456,700

[22] Filed: Jan. 10, 1983

[51] Int. Cl.³ .............................................. G02B 21/34
[52] U.S. Cl. ..................................... 350/536; 356/244
[58] Field of Search ....................... 350/534, 535, 536; 356/244

[56] References Cited

U.S. PATENT DOCUMENTS

| 2,302,830 | 11/1942 | Axelrod | 350/536 |
| 3,141,547 | 7/1964 | Newby | 356/244 |
| 3,141,548 | 7/1964 | Newby | 350/536 |
| 3,777,283 | 12/1983 | Elkins | 350/536 |
| 3,829,216 | 8/1974 | Persidsky | 350/535 |

Primary Examiner—Jon W. Henry
Attorney, Agent, or Firm—Edgar W. Averill, Jr.

[57] ABSTRACT

A microscopic evaluation slide for viewing liquid specimens. The slide has a viewing area having side walls extending up from a base and completely surrounding the viewing area. A transparent cover sheet is permanently affixed to the side walls and has at least one opening passing into the viewing area. Liquid samples to be viewed are injected through the opening into the viewing area.

12 Claims, 7 Drawing Figures

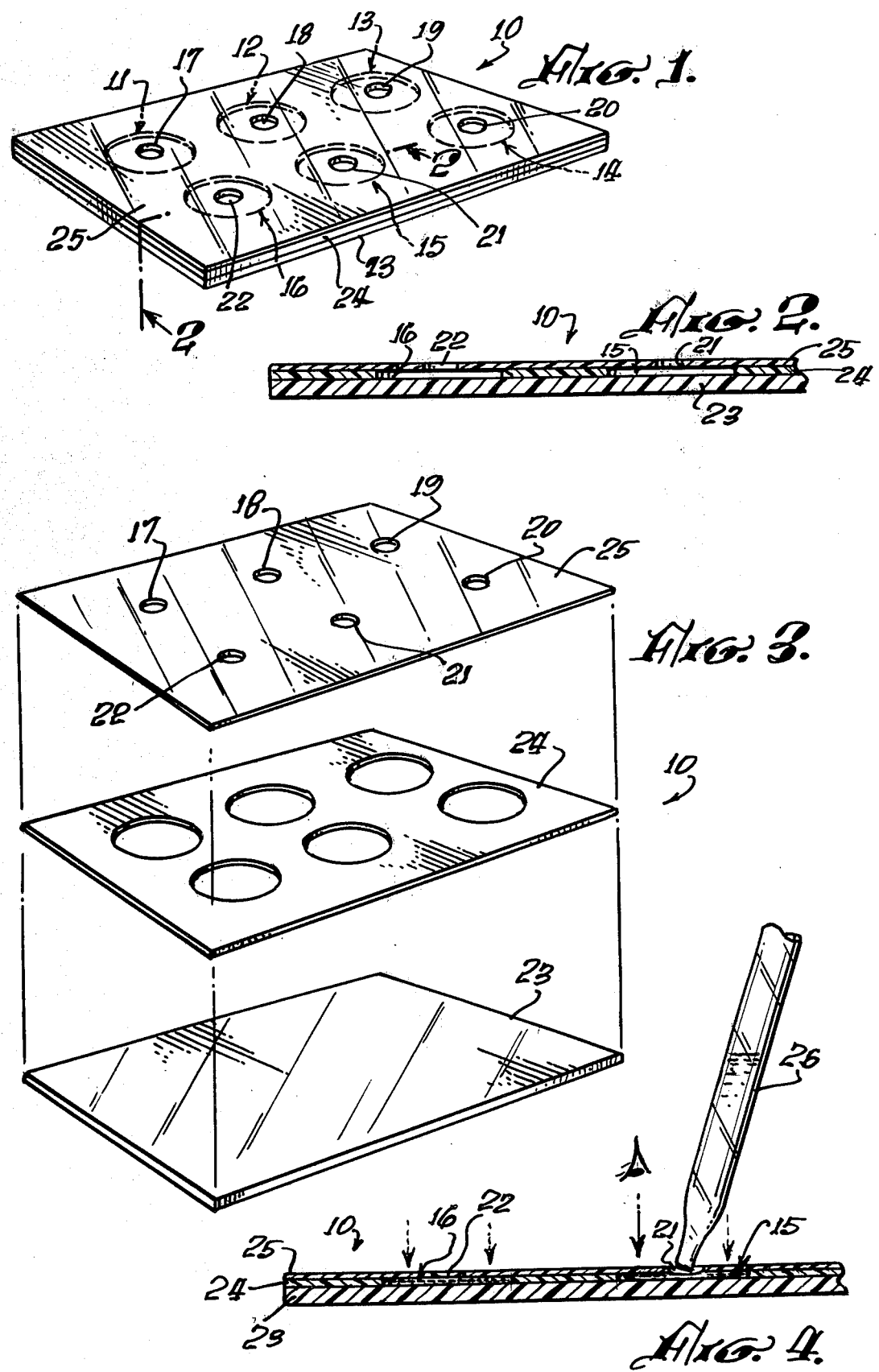

MICROSCOPIC EVALUATION SLIDE

CROSS REFERENCE TO RELATED APPLICATION

The present application is being filed on the same day as applicant's application Ser. No. 456,699 called "Test Strip With Reagent Pads."

BACKGROUND OF THE DISCLOSURE

The field of the invention is laboratory evaluation apparatus and the invention relates more specifically to devices useful in viewing liquid specimens under a microscope. This field has become highly developed for several specific techniques applicable to the present invention. The most common of which is a microscopic evaluation of the urine sediment.

A highly reproducible system for microscopic evaluation of sediment is disclosed in applicant's U.S. Pat. No. 3,777,283, which discloses a microscopic slide having a plurality of transparent viewing areas. The viewing areas are loaded by placing liquid on a platform that communicates with the viewing area. The liquid is then drawn into the viewing area by capillary action and is held to the desired predetermined thickness for optimum viewing.

Other liquid viewing devices are also disclosed in the prior art. One such device is shown in the Fielding U.S. Pat. No. 3,565,537, which shows a specimen holder useful for the optical evaluation of samples of blood. The Lilja U.S. Pat. No. 4,088,448, discloses a device for taking samples which may be transparent and which draws the sample into the device by capillary action. A blood sample holder is shown in U.S. Pat. No. 3,198,064 to Moore and discloses a pair of parallel plates which hold the sample in a film of a predetermined thickness. A liquid inspection slide is shown in U.S. Pat. No. 3,961,346 to White and, like applicants earlier mentioned patent has a plurality of transparent viewing areas loaded from a platform.

Outside of the medical field a liquid sampling and viewing device is shown in a patent to Johnson U.S. Pat. No. 3,905,702 which provides a thin film of oil formed by capillary action in a transparent viewing chamber so that the solid contaminents in the oil may be viewed. The opacity of the oil may be observed by the unaided eye.

With further sophistication and urinalysis techniques there has been an increasing tenancy toward the use of pipettes and disposable pipettes such as that shown in U.S. Pat. No. 4,022,576 to Parker are widely used. This facilitates the transfer of the sample from the test tube to the microscopic slide. Because of the ease of use of such pipettes it is appropriate that microscopic slides be developed which take advantage of the capabilities of such pipettes.

SUMMARY OF THE INVENTION

The present invention is for a microscopic evaluation slide for viewing liquid specimens. The slide has a base having at least one flat viewing area. Side walls extend up from the base completely surrounding the viewing area. A transparent cover sheet affixed to the side walls in a sealed relationship therewith. The transparent cover sheet has at least one opening passing therethrough. The cover sheet is positioned about parallel to the flat viewing area and between about 1/1000ths and 20/1000ths of an inch therefrom.

BRIEF DESCRIPTION OF THE DRAWINGS

FIG. 1 is a perspective view of the slide of the present invention.

FIG. 2 is an enlarged cross sectional view taken along line 2—2 of FIG. 1.

FIG. 3 is an exploded perspective view of the slide of FIG. 1.

FIG. 4 is an enlarged cross sectional view analogous to FIG. 2 further showing a liquid sample and a portion of a pipe cut.

DESCRIPTION OF THE PREFERRED EMBODIMENTS

A microscopic evaluation slide 10 has six viewing chambers 11 through 16. These viewing chambers have openings 17 through 22, respectively, which permit the introduction of samples into the chambers. Chambers 15 and 16 are shown in cross sectional view in FIG. 2.

Figure 5:
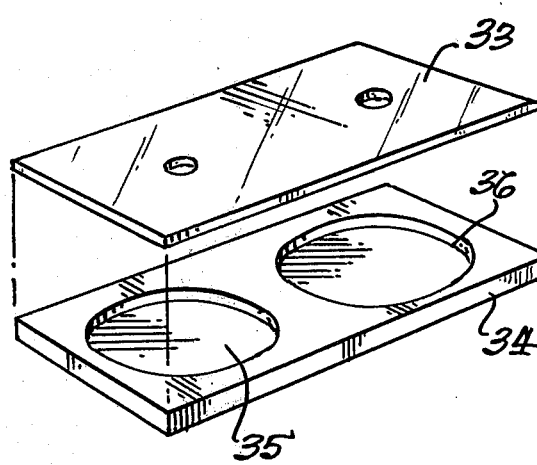
FIG. 5 is an exploded perspective view of an alternate configuration of the slide of FIG. 1.

Slide 10 is shown in exploded view in FIG. 3 and can be seen to consist of three layers, a base layer 23, a wall layer 24, and a cover layer 25, which are laminated into a unitary slide. As discussed further below, it is possible to combine any two adjacent layers to form a two layer laminate. For instance, layer 24 and base layer 23 can be molded into a unitary unit such as shown in FIG. 5 and discussed below. Alternatively, cover layer 25 and wall layer 24 could be formed of a single sheet with a two step opening passing therethrough and this sheet laminated to base layer 23.

Typically all three layers will be made from a transparent material such as polystyrene. It is known that for some liquids it is important that the polymer from which the article is made have some affinity for the liquid to encourage the capillary action which exists to fill the viewing chambers. For instance, for some liquids it may be appropriate to use polystyrene and for others it would be necessary to use polymers having the property of hygroscopicity such as cellulose ester compositions including cellulose acetate and cellulose acetate butyrate. The wettability of polymers is a subject known to skilled polymer chemists and the normal considerations in that regard apply to the materials of construction of the present invention.

Base layer 23 should be sufficiently thick to provide the desired structural strength for slide 10. The depth of the chambers is a function of the thickness of wall layer 24 when the slide is laminated as suggested in FIG. 3. This thickness is important and thickness of 0.001 of an inch to 0.020 of an inch is believed useful with thickness of 0.006 of an inch to 0.012 of an inch being preferred and about 0.010 of an inch being ideal. The thickness is important for two reasons. First, a relatively small thickness is required to provide capillary flow to fill the chamber. Second the sample must be thick enough to carry the non homogeneous material into the chamber so that it may be viewed. Such materials in typical urinalysis include white cells, red cells, bacteria, yeast cells, crystals and various cellular material. Such materials are typically collected by centrifugation and transferred by a pipette such as that shown in U.S. Pat. No. 4,022,576 to Parker. In this manner the objects to be viewed under the microscope are concentrated from a large sample to a relatively small volume which then can be transferred through openings such as opening 22 into the interior of the chamber. The lower end 26 of a pipette is shown in FIG. 4 at the opening 21 of viewing chamber 15. After chamber 15 has been filled, the slide may be moved under a microscope and viewed as suggested in FIG. 4. Cover layer 25 and base layer 23 are parallel so that the viewing is not distorted. A different sample has been placed in chamber 16 in FIG. 4 and, of course, different samples can be placed in each of the different chambers.

Figure 6:
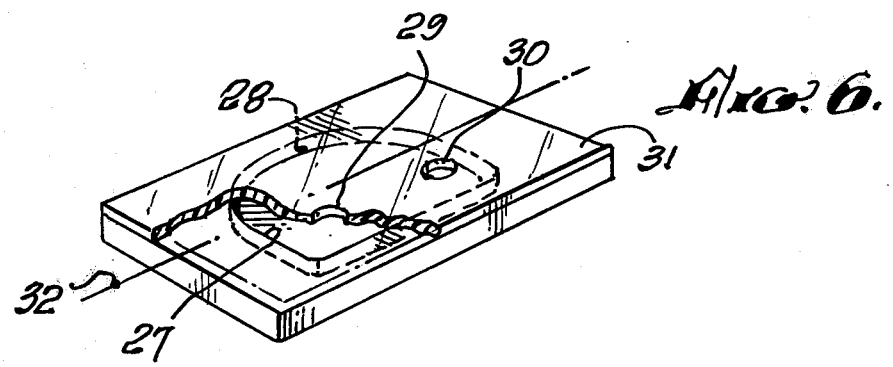
FIG. 6 is a perspective view of an alternate configuration of the slide of FIG. 1.

While the openings in cover layer 25 are shown as concentric circles with respect to the openings in wall layer 24, they need not be either concentric nor circular. Furthermore, the openings in wall layer 24 need not be circular, but may be formed in any desired shape. The configuration shown in FIG. 6 of the drawings depicts a generally dome or bee-hive shaped chamber 27 having a vertical wall 28 which completely surrounds the chamber and it is sealed to the upper cover layer 31. A pair of openings 29 and 30 permit injection of liquids into either opening and also assist in the escape of air as the liquid is being introduced. Also for many applications it is beneficial that the center line of the slide indicated by reference character 32 be used as the viewing line and be free from openings such as openings 29 and 30. Thus, these openings are offset from center line 32 and a plurality of chambers may be positioned in a straight line to facilitate rapid viewing. This same arrangement could, of course, be adapted to two or more rows of chambers analogous to those shown in slide 10 of FIG. 1.

The use of a two piece laminate is shown in FIG. 5 where cover layer 33 is laminated to base and wall layer 34 which contains chambers 35 and 36. The two layers may be laminated by conventional techniques which may include the use of an adhesive, heat and pressure or simply the use of adhesive and pressure without heat. Other lamination techniques such as described in U.S. Pat. No. 3,565,537 suggesting ultrasonic welding could also be used. The particular laminating technique is not an essential feature of the present invention and will depend upon the particular polymer or polymers used and other conventional considerations.

Figure 7:
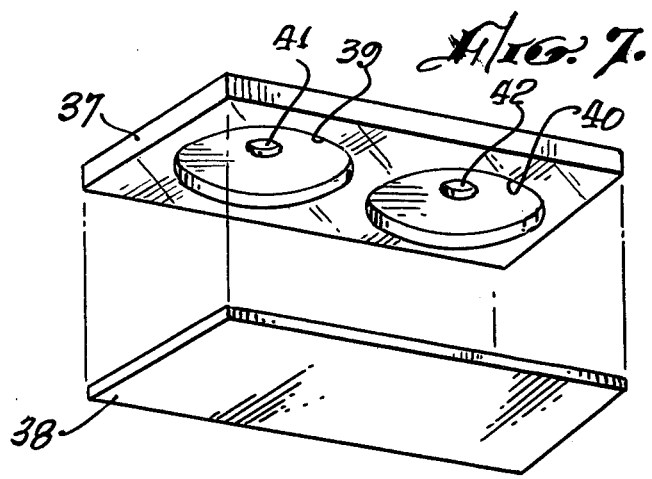
FIG. 7 is an exploded perspective view showing an alternate embodiment of the slide of FIG. 1.

A different configuration showing a two piece laminate is shown in FIG. 7. The cover layer and the wall layer are molded from an integral sheet 37. Base layer 38 is laminated to layer 37 to form the final slide. The chambers 39 and 40 have openings 41 and 42 which are used in a manner analogous to the slide of FIG. 1.

Since the cover layer and the base layer are typically formed from separate sheets it is possible to use either different polymers or the same polymer having different light transmission capabilities. For instance, for some applications it may be desirable to have a translucent base in combination with a transparent cover. For other applications it might be desirable to have an opaque wall layer such as wall layer 24 which could contain printing or other indicia useful in providing aid in using the slide.

The size of the openings leading in to the viewing area should be large enough to permit ready entry of fluid into the chamber. It should not be so large as to interfere with the viewing area. In most applications an opening which covers no more than about one-half of the viewing area and preferably about 10% to 20% of this area. While the openings are generally referred to herein as circular they may, of course, be oblong, rectangular, or otherwise depending upon considerations relating to the type of sample feeding mechanism being used. For instance, the hole should be of a sufficient size and appropriate shape so that the feeding tip does not completely cover the hole since the hole may be used for escape of air from within the chamber. In other applications where there are a plurality of holes such as that shown in FIG. 6 the shape may more completely approximate the shape of the feeding tips so that the air can escape from the other openings.

While the slide of the present invention has been discussed largely in conjunction with urinalysis techniques the slide is, of course, used for other microscopic evaluations. With further trends toward automation, the slide of the present application can be formed in a shape to adapt itself to many different types of automated equipment.

The present embodiments of this invention are thus to be considered in all respects as illustrative and not restrictive, the scope of the invention being indicated by the appended claims rather than by the foregoing description. All changes which come within the meaning and range of equivalency of the claims therefore are intended to be embraced therein.

What is claimed is:

1. A microscopic evaluation slide for viewing liquid specimens, said sliding comprising:
   a base having at least one flat viewing area;
   side walls extending from the base completely surrounding said viewing area;
   a transparent cover sheet affixed to said side walls in a sealed relationship therewith, said transparent cover sheet having a flat, planar upper surface and said cover sheet completely covering said base and having at least one opening therethrough and said cover sheet being positioned about parallel to the flat viewing area and between 0.001 and 0.020 inches therefrom.

2. The microscopic evaluation slide of claim 1 wherein said base is transparent.

3. The microscopic evaluation slide of claim 1 wherein said cover sheet is between 0.006 and 0.012 inches from the base.

4. The microscopic evaluation slide of claim 1 wherein said cover sheet is about 0.010 inches from the base.

5. The microscopic evaluation slide of claim 1 wherein the base and the side walls are integrally formed.

6. The microscopic evaluation slide of claim 1 wherein the base sheet, a wall sheet and a cover sheet are laminated together to form the final slide.

7. The microscopic evaluation slide of claim 1 wherein said viewing area is circular.

8. The microscopic evaluation slide of claim 7 wherein said hole is circular and above the center of the viewing area.

9. A microscopic slide for viewing liquid specimens, said slide comprising:
   a base having at least one flat viewing area, the bottom of said viewing area being transparent;
   side walls completely surrounding said viewing area; and
   a transparent cover sheet affixed to said side walls said transparent cover sheet having a flat, planar upper surface and said cover sheet completely covering said base and having at least one opening therethrough to permit the introduction of a liquid sample onto the flat viewing area, said cover sheet being positioned about parallel to the flat viewing area and from 0.001 to 0.020 inches therefrom.

10. The microscopic slide of claim 9 where said base has more than one viewing area.

11. The microscope slide of claim 9 wherein said cover sheet is 0.006 to 0.012 inches from said flat viewing area.

12. The microscope slide of claim 9 wherein there are a plurality of openings in said transparent cover sheet.

* * * * *